: US 8,587,267 B2
(45) Date of Patent: Nov. 19, 2013

(12) United States Patent
Suntio et al.

(54) CURRENT-FED CONVERTER

(75) Inventors: Teuvo Suntio, Ylöjärvi (FI); Lari Nousiainen, Tampere (FI)

(73) Assignee: ABB Oy, Helsinki (FI)

( * ) Notice: Subject to any disclaimer, the term of this patent is extended or adjusted under 35 U.S.C. 154(b) by 143 days.

(21) Appl. No.: 13/180,267

(22) Filed: Jul. 11, 2011

(65) Prior Publication Data

US 2012/0007576 A1    Jan. 12, 2012

(30) Foreign Application Priority Data

Jul. 12, 2010 (EP) .................................... 10169233

(51) Int. Cl.
G05F 1/253 (2006.01)
(52) U.S. Cl.
USPC .......................................... 323/262; 323/906
(58) Field of Classification Search
USPC .............. 363/133, 95, 97, 98, 131, 17, 56.02, 363/132; 323/266, 299, 262, 906
See application file for complete search history.

(56) References Cited

U.S. PATENT DOCUMENTS

| 5,038,267 | A |   | 8/1991  | De Doncker et al. |
| 5,383,109 | A | * | 1/1995  | Maksimovic et al. ........ 323/222 |
| 5,625,539 | A | * | 4/1997  | Nakata et al. .................. 363/17 |
| 6,518,711 | B2 | * | 2/2003 | Chao .......................... 315/209 R |
| 7,606,053 | B2 |   | 10/2009 | Chen et al. |
| 7,683,654 | B2 |   | 3/2010  | Chen et al. |
| 7,834,485 | B2 |   | 11/2010 | Park |
| 7,843,085 | B2 | * | 11/2010 | Ledenev et al. ................. 307/80 |
| 7,889,519 | B2 | * | 2/2011  | Perreault et al. ........... 363/21.02 |
| 8,319,483 | B2 | * | 11/2012 | Fishelov et al. ................ 323/271 |
| 8,324,921 | B2 | * | 12/2012 | Adest et al. .............. 324/761.01 |
| 8,467,200 | B2 |   | 6/2013  | Pan et al. |
| 2002/0034083 | A1 |   | 3/2002 | Ayyanar et al. |
| 2004/0135560 | A1 | * | 7/2004 | Kernahan et al. ............. 323/282 |
| 2005/0180175 | A1 |   | 8/2005 | Torrey et al. |
| 2007/0029881 | A1 |   | 2/2007 | Lai |

(Continued)

FOREIGN PATENT DOCUMENTS

WO    WO 2009/051853    4/2009

OTHER PUBLICATIONS

European Search Report issued on Jan. 13, 2011 for EP 10169233.3.

(Continued)

*Primary Examiner* — Gary L Laxton
*Assistant Examiner* — Kyle J Moody
(74) *Attorney, Agent, or Firm* — Buchanan Ingersoll & Rooney PC

(57) ABSTRACT

A converter circuit includes first and second input terminals, first and second capacitors, the second capacitor having a first terminal connected to the second input terminal and a second terminal forming a positive voltage node, first and third semiconductor components connected in series between the first input terminal and the positive voltage node, the midpoint between the series connection forming a first node, and a series connection of a first inductive component, a diode and a second inductive component. The series connection is connected between the second input terminal and the node. The diode's polarity allows current to pass from the direction of the second input terminal. A second node is formed between the first inductive component and the diode, and a third node is formed between the diode and the second inductive component. A third capacitor is connected between the first input terminal and the third node.

16 Claims, 8 Drawing Sheets

(56) References Cited

U.S. PATENT DOCUMENTS

| | | | |
|---|---|---|---|
| 2008/0122429 A1* | 5/2008 | Cho | 324/107 |
| 2009/0039852 A1 | 2/2009 | Fishelov et al. | |
| 2009/0218887 A1 | 9/2009 | Ledenev et al. | |
| 2009/0284240 A1* | 11/2009 | Zhang et al. | 323/285 |
| 2010/0038968 A1 | 2/2010 | Ledenev et al. | |
| 2010/0229915 A1* | 9/2010 | Ledenev et al. | 136/244 |
| 2010/0236612 A1 | 9/2010 | Khajehoddin et al. | |
| 2010/0253150 A1 | 10/2010 | Porter et al. | |
| 2010/0308662 A1 | 12/2010 | Schatz et al. | |
| 2011/0026281 A1* | 2/2011 | Chapman et al. | 363/65 |
| 2011/0032734 A1* | 2/2011 | Melanson | 363/37 |
| 2011/0273909 A1 | 11/2011 | Christopher | |
| 2012/0042588 A1 | 2/2012 | Erickson, Jr. | |

OTHER PUBLICATIONS

European Search Report issued on Jan. 13, 2011 for EP 10169229.1.

Gerry Moschopoulos, "Quadratic Power Conversion for Industrial Applications", 2010 Twenty-Fifth Annual IEEE, Feb. 21, 2010, pp. 1320-1327, XP-031649600.

J. Leppäaho et al., "Solar-Generator-Interfacing With a Current-Fed Superbuck Converter Implemented by Duality-Transformation Methods", The 2010 International Power Electronics Conference, IEEE, Jun. 21, 2010, pp. 680-687, XP-002614810 and XP-002614878.

Jean-Paul Gaubert et al., "Evaluation of DC-To-DC Converters Topologies With Quadratic Conversion Ratios for Photovoltaic Power Systems", Power Electronics and Applications, Sep. 8, 2009, pp. 1-10, XP-031541615.

Dragan Maksimovic et al., "Switching Converters With Wide DC Conversion Range", vol. 6, No. 1, Jan. 1, 1991, pp. 151-157, XP-000175329.

Chinese Office Action issued on Aug. 6, 2013 by the Chinese Patent Office in corresponding Chinese Patent Application No. 201110199687.2, and English translation thereof.

Zhou degui, et al., Optimized Control and Stability Analyses of Photovolatic Grid-connected System of 300 kW, Electrotechnical Journal, vol. 23, No. 11, Nov. 30, 2008, pp. 116-122.

Zhou Jing et al., Design of DSP-based Photovoltaic Grid-connected System, Journal of Xiamen University of Technology, vol. 16, No. 4, Dec. 31, 2008, pp. 47-51.

U.S. Office Action issued on Aug. 30, 2013 in corresponding U.S. Appl. No. 13/180,252.

* cited by examiner

CURRENT-FED CONVERTER

RELATED APPLICATION

This application claims priority under 35 U.S.C. §119 to European Patent Application No. 10169233.3 filed in Europe on Jul. 12, 2010, the entire content of which is hereby incorporated by reference in its entirety.

FIELD

The present disclosure relates to converters, and more particularly to, current-fed converters having semi quadratic properties.

BACKGROUND INFORMATION

Converters are common electric apparatuses that are used for converting electricity from one form to another. Converters are used for rising or lowering voltage or current levels to adapt the voltage of a source to the voltage of the load.

Converters are also used in connection with photovoltaic (PV) panels for supplying the power available from the panels. The power may be supplied directly to an alternating voltage network, to a DC-voltage bus or to a power consuming load. Depending on the amount of PV cells or panels connected for supplying power, the voltage is either raised or lowered for supplying the load with appropriate voltage.

In connection with the PV systems, the converter system also keeps the operating point of the panel at its maximum power point. A PV panel has a certain operating point at which the extracted power has its maximum. A maximum power point tracker (MPPT) calculates the operating point from the measured current and voltage of the panel and gives a reference value for either output voltage or current of the panel. The control system of the converter controls the actual output value of the panel to the reference, and the maximum available power is obtained from the panel. The MPPT calculates continuously the reference value and the control system adapts to this situation enabling continuous operation in the maximum power point regardless of the varying operating conditions.

Converter topologies can be roughly divided into current fed and voltage fed converters. In voltage fed converters, the power source feeds a voltage to the input of the converter. In current fed converters, the source feeds current to the input. Due to the constant-current nature of PV panels, the optimal interfacing of the panels can be implemented by using current fed converters. A current fed converter can operate within the whole range of the UI curve of the panel from the short-circuit to open-circuit conditions. In voltage-fed converters, the operation can only be carried out at the voltages equal or higher than the maximum power point voltage.

SUMMARY

An exemplary embodiment of the present disclosure provides a converter circuit which includes first and second input terminals for receiving an input current from a current source, a first capacitor connected between the first and second input terminals, and a second capacitor having a first terminal connected to the second input terminal, and a second terminal forming a positive voltage node. The exemplary converter circuit also includes first and third semiconductor components connected in series between the first input terminal and the positive voltage node, where a midpoint between the series connection forms a first node. The exemplary converter circuit includes a series connection of a first inductive component, a first diode and a second inductive component, where the series connection is connected between the second input terminal and the first node, and a polarity of the first diode is such that the first diode allows a current to pass from a direction of the second input terminal. In addition, the exemplary converter circuit includes a second node formed by a point between the first inductive component and the first diode, a third node formed by a point between the first diode and the second inductive component, a second diode connected between the second node and the first node to allow current to pass from a direction of the second node to the first node, and a third capacitor connected between the first input terminal and the third node. The exemplary converter circuit also includes second and fourth semiconductor components connected in series in parallel with the series connection of the first and third semiconductor components. In addition, the exemplary converter circuit includes a third inductive component having a first end which is connected to a fourth node formed between the second and fourth semiconductor components, and a second end which produces first output terminal, where the first input terminal forms a second output terminal. The first and the third semiconductor components are configured to control a voltage between the first and second input terminals.

An exemplary embodiment of the present disclosure provides a method of controlling a converter. The converter includes first and second input terminals for receiving an input current from a current source, a first capacitor connected between the first and second input terminals, and a second capacitor having a first terminal connected to the second input terminal, and a second terminal forming a positive voltage node. The converter also includes first and third semiconductor components connected in series between the first input terminal and the positive voltage node, where a midpoint between the series connection forms a first node. The converter includes a series connection of a first inductive component, a first diode and a second inductive component, where the series connection is connected between the second input terminal and the first node, and a polarity of the first diode is such that the first diode allows a current to pass from a direction of the second input terminal. In addition, the converter includes a second node formed by a point between the first inductive component and the first diode, a third node formed by a point between the first diode and the second inductive component, a second diode connected between the second node and the first node to allow current to pass from a direction of the second node to the first node, and a third capacitor connected between the first input terminal and the third node. The converter also includes second and fourth semiconductor components connected in series in parallel with the series connection of the first and third semiconductor components. In addition, the converter includes a third inductive component having a first end which is connected to a fourth node formed between the second and fourth semiconductor components, and a second end which produces first output terminal, where the first input terminal forms a second output terminal. The exemplary method includes measuring the input current and an input voltage, and generating a voltage reference for the input voltage. In addition, the exemplary method includes controlling the first and third semiconductor components in response to the measured voltage and voltage reference.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a current fed converter structure having low losses and wide input voltage range.

Exemplary embodiments of the present disclosure are based on the idea of using a current fed converter structure having a new topology. In accordance with an exemplary embodiment, the converter of the present disclosure has a wide conversion ratio producing semi quadratic current characteristics in view of the duty ratio of the converter. The topology of the converter can be used to extract the maximum power from a power source, such as a photovoltaic panel, for example. The topology can be used for supplying voltage to a DC bus or with back end inverter to an alternating voltage grid.

In accordance with an exemplary embodiment of the converter, when connected via inverter part to the grid, the power fluctuations at twice the grid frequency are not visible at the input terminals of the converter, thus reducing the problems relating to the fluctuation of the PV panel operating point.

Figure 1:
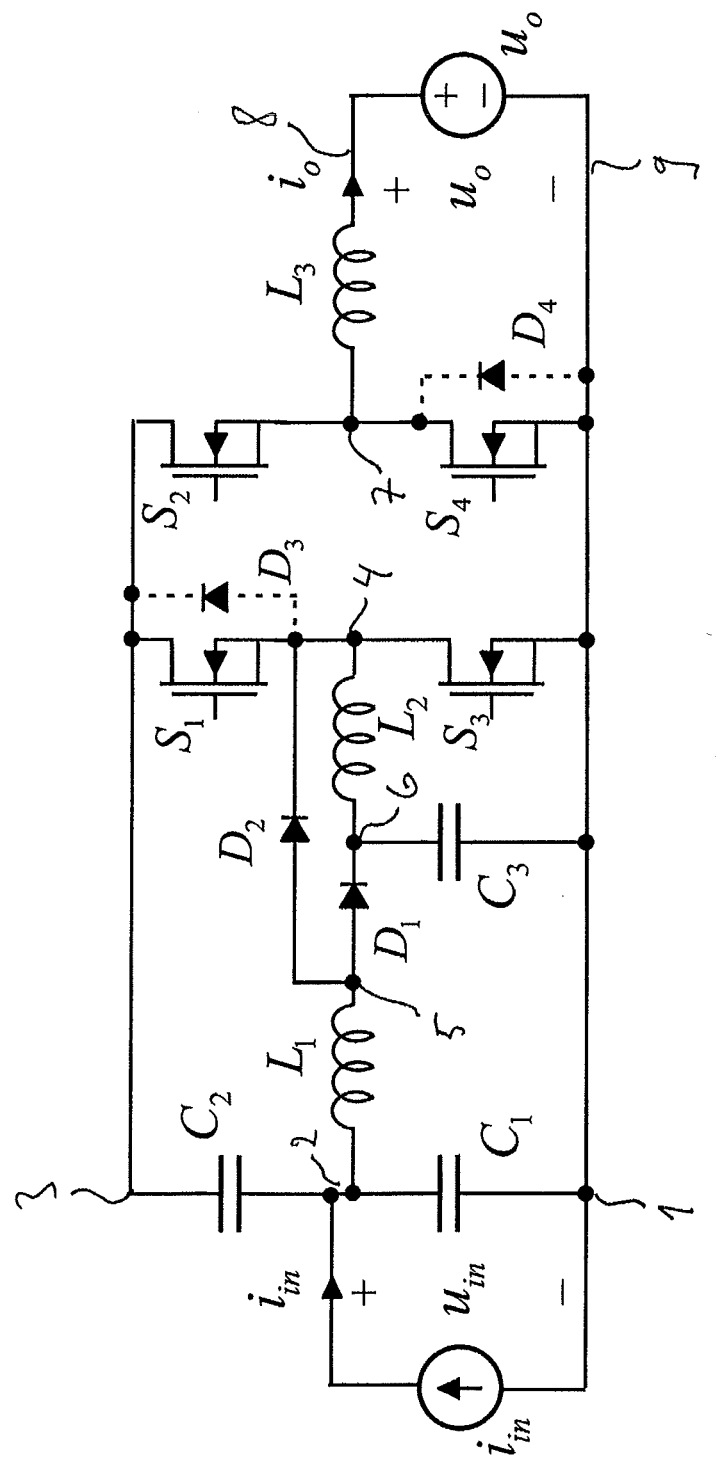
FIG. 1 illustrates the main circuit of a converter according to an exemplary embodiment of the present disclosure.

FIG. 1 shows the circuit diagram of a current-fed semi quadratic buck-boost converter according to an exemplary embodiment of the present disclosure. In FIG. 1, a current source is connected between first and second input terminals 1, 2 in parallel with a capacitor $C_1$. Another capacitor $C_2$ is connected to the second input terminal, and the other terminal of the capacitor $C_2$ forms a positive voltage node 3.

The converter further includes a series connection of first and third semiconductor components $S_1$, $S_3$. The series connection is connected between the first input terminal 1 and the positive voltage node 3. In accordance with an exemplary embodiment, the first semiconductor component can either be a controlled switch component, such as FET-component, or a diode, for example. The diode $D_3$ is illustrated in FIG. 1 in dashed line and as mentioned, diode $D_3$ can be substituted for the switch component $S_1$. The third semiconductor component is a controlled switch component. The polarities of the components are such that when turned on, the current can flow through the components from the positive voltage node towards the first input terminal, and as a result, the voltage from the positive voltage node is blocked.

The midpoint between the semiconductor components $S_1$ and $S_3$ is denoted as the first node 4 for simplicity of description.

A series connection of first inductive component $L_1$, first diode $D_1$ and second inductive component $L_2$ is connected between the second input terminal 2 and the first node 4. The diode allows the current to pass from the direction of the second input terminal 2. A second diode $D_2$ is connected in parallel with the series connection of the first diode $D_1$ and the second inductor L2 (e.g., from node 5 to node 4). The polarity of the second diode is similar to that of the first diode, and current can pass from the second node 5 to the first node 4.

The converter also includes a third capacitor $C_3$, which is connected between the first input terminal 1 and the third node 6, which is the connection point between the first diode $D_1$ and the second inductor $L_2$.

Further, the converter of FIG. 1 includes second and fourth semiconductor components $S_2$, $S_4$ connected in series. The series connection is connected in parallel with the first and third semiconductor components with similar polarities. As with the first and third semiconductors, both the components $S_2$ and $S_4$ may be controlled switches. As indicated in FIG. 1, the fourth switch may be replaced with a diode $D_4$.

A third inductor $L_3$ is connected to the point between the second and fourth semiconductor components, and this point is also referred to as fourth node 7. The other end of the third inductor forms a first output terminal 8 and the second output terminal 9 has the same potential as the first input terminal 1.

According to an exemplary embodiment of the present disclosure, the first and third semiconductor components are configured to control the voltage $u_{in}$ between the first and second input terminals 1 and 2, e.g., the input voltage. Since the converter is a current fed converter, the input current to the converter depends on the supplying source, and the voltage is controlled with the switches to the voltage that suits the operation best.

The current-fed semi quadratic buck-boost converter shown in FIG. 1 has steady-state conversion ratios such that the input current ($I_{in}$) is reflected to the output ($I_o$) multiplied by the square of the duty ratio and divided by the complement of the duty ratio (i.e., $M(D)=D^2/D'$) and the output voltage ($U_o$) to the input ($U$)$_{in}$ with the same conversion ratio. The converter is a combination of buck ($S_1$, $S_3$) and boost ($S_2$, $S_4$) type-converters which can be controlled either separately (dual PWM mode) or together (single PWM mode). In the following, the operation of the converter is first studied in the single PWM mode operation and then in the dual PWM mode operation.

Single PWM Mode

Figure 2:
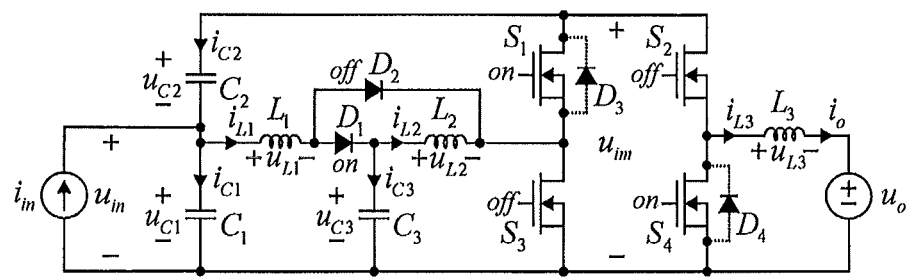
FIG. 2 shows the converter of FIG. 1 with current and voltage definitions according to an exemplary embodiment of the present disclosure.

An exemplary power stage of the current-fed semi quadratic buck-boost converter of the present disclosure is shown in FIG. 2 with the defined components and the polarities of relevant currents and voltages. As mentioned above, the on-time switches $S_1$ and $S_4$ can also be substituted with diodes $D_3$ and $D_4$.

Figure 3:
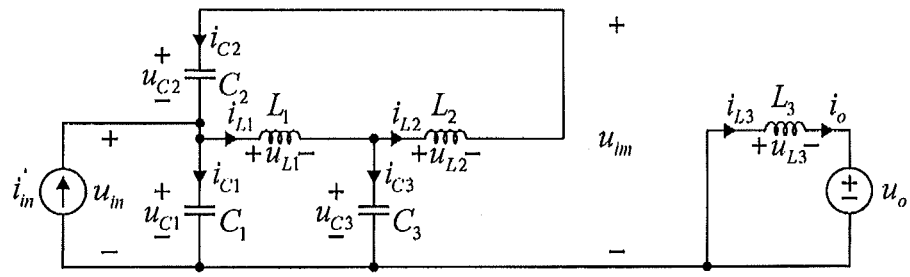
FIG. 3 shows the on-time circuit structure of the converter according to an exemplary embodiment of the present disclosure.
Figure 4:
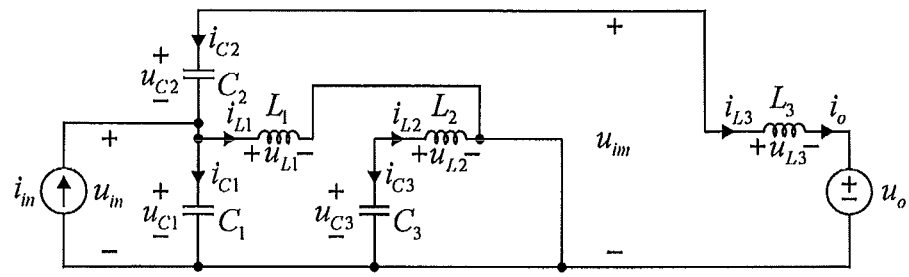
FIG. 4 shows the off-time circuit structure of the converter according to an exemplary embodiment of the present disclosure.

During the on-time, the switches $S_2$ and $S_3$ and the diode $D_2$ are off and the switches $S_1$ and $S_4$ and the diode $D_1$ are conducting, yielding the on-time circuit structure given in FIG. 3. During the off-time, the switches $S_2$ and $S_3$ and the diode $D_2$ are conducting and the switches $S_1$ and $S_4$ and the diode $D_1$ are off, yielding the off-time circuit structure given in FIG. 4.

During the on-time we can calculate applying Kirchhoff's laws that $$u_{L1} = u_{C1} - u_{C3}$$
$$u_{L2} = -u_{C1} - u_{C2} + u_{C3}$$
$$u_{L3} = -u_o$$
$$i_{C1} = i_{in} - i_{L1} + i_{L2}$$
$$i_{C2} = i_{L2}$$
$$i_{C3} = i_{L1} - i_{L2}$$
$$u_{im} = u_{C1} + u_{C2}$$
$$u_{in} = u_{C1}$$
$$i_o = i_{L3} \qquad (1).$$

During the off-time we can calculate applying Kirchhoff's laws that $$u_{L1} = u_{C1}$$
$$u_{L2} = u_{C3}$$
$$u_{L3} = u_{C1} + u_{C2} - u_o$$
$$i_{C1} = i_{in} - i_{L1} - i_{L3}$$
$$i_{C2} = -i_{L3}$$
$$i_{C3} = -i_{L2}$$
$$u_{im} = u_{C1} + u_{C2}$$
$$u_{in} = u_{C1}$$
$$i_o = i_{L3} \qquad (2).$$

According to (1) and (2), the average voltages across the inductors, average currents through the capacitors as well as average input voltage, intermediate voltage $u_{im}$ (e.g., the voltage of the series connection of the capacitors $C_1$ and $C_2$) and output current become as $$\langle u_{L1} \rangle = \langle u_{C1} \rangle - d \langle u_{C3} \rangle$$
$$\langle u_{L2} \rangle = \langle u_{C3} \rangle - d \langle u_{C1} \rangle - d \langle u_{C2} \rangle$$
$$\langle u_{L3} \rangle = (1-d) \langle u_{C1} \rangle + (1-d) \langle u_{C2} \rangle - \langle u_o \rangle$$
$$\langle i_{C1} \rangle = \langle i_{in} \rangle - \langle i_{L1} \rangle + d \langle i_{L2} \rangle + (d-1) \rangle i^{L3} \rangle$$
$$\rangle i_{C2} \rangle = d \rangle i_{L2} \rangle + (d-1) \rangle i_{L3} \rangle$$
$$\rangle i_{C3} \rangle = d \rangle i_{L1} \rangle - \rangle i_{L2} \rangle$$
$$\rangle u_{im} \rangle = \rangle u_{C1} \rangle + \rangle u_{C2} \rangle$$
$$\rangle u_{in} \rangle = \rangle u_{C1} \rangle$$
$$\rangle i_o \rangle = \rangle i_{L3} \rangle \qquad (3).$$

In the above set of equations, the subscripts denote the component the current or voltage of which is denoted by that equation. In order to maintain flux linkage and charge balances, the average voltages across the inductors and average currents through the capacitors have to be zero. According to these principles the operating-point-related steady-state variables become with denoting $D'=1-D$ $$I_{L1} = I_{in} \qquad (4)$$
$$I_{L2} = DI_{in}$$
$$I_{L3} = \frac{D^2}{D'} I_{in}$$
$$U_{C1} = \frac{D^2}{D'} U_o$$
$$U_{C2} = (D+1) U_o$$
$$U_{C3} = \frac{D}{D'} U_o$$
$$U_{im} = \frac{1}{D'} U_o$$
$$U_{in} = \frac{D^2}{D'} U_o$$
$$I_o = \frac{D^2}{D'} I_{in}$$

which indicates that the input current is reflected to the output multiplied by the square of the duty ratio and divided by its complement (e.g., $M(D)=D^2/D'$), and the output voltage to the input with the same conversion ratio. The output voltage is reflected to the intermediate voltage divided by the complement of the duty ratio. The switching frequency of the converter is assumed to be $f_s$ and consequently, the cycle time $T_s=1/f_s$. The duty cycle $D=T_{on}/T_{off}$ and therefore, the length of on-time $T_{on}=DT_s$ and the length of off-time $T_{off}=D'T_s$ because $T_s=T_{on}+T_{off}$.

Figure 5:
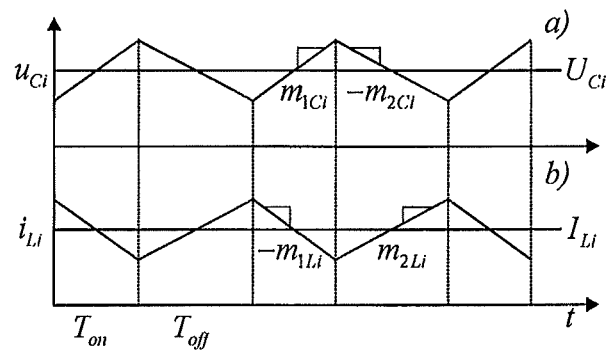
FIG. 5 shows approximate waveforms of voltages and currents according to an exemplary embodiment of the present disclosure.
Figure 6:
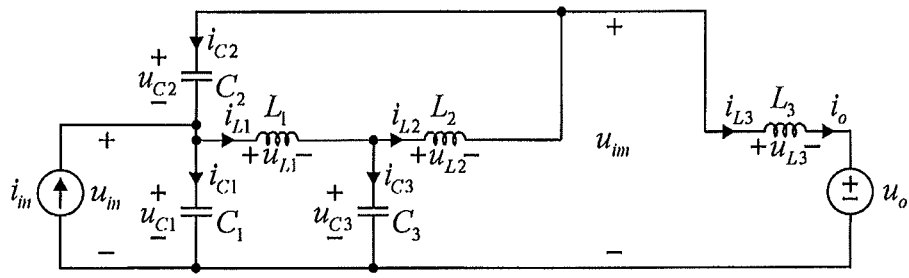
FIG. 6 shows the on-off-time circuit structure of the converter according to an exemplary embodiment of the present disclosure.

The approximate waveforms of the capacitor voltages and inductor currents are shown in FIG. 5. The steady-state values are assumed to be large compared to the peak-to-peak ripple, e.g., only steady-state values affect the ripple slopes. The approximate waveform of the capacitor voltages is shown in FIG. 5 as the curve a) exhibiting triangle shapes. The on-time and off-time slopes of the waveform are denoted by $m_{1Ci}$ and $-m_{2Ci}$. They can be given for the capacitor $C_1$ by $m_{1C1}=DI_{in}/C_1$ and $m_{2C1}=D^2I_{in}/(D'C_1)$ as well as for the capacitor $C_2$ by $m_{1C2}=DI_{in}/C_2$ and $m_{2C2}=D^2I_{in}/(D'C_2)$ and for the capacitor $C_3$ by $m_{1C3}=D'I_{in}/C_3$ and $m_{2C3}=DI_{in}/C_3$. According to the defined slopes, the peak-to-peak ripples associated to the capacitors can be determined by $\Delta u_{Ci-pp}=m_{1Ci}DT_s$. The average voltages are defined in (4). The selection of the capacitors can be based on the defined peak-to-peak ripple and average voltages.

The approximate waveform of the inductor currents is shown in FIG. 5 as the curve b) also exhibiting triangle shapes. The on-time and off-time slopes of the waveform are denoted by $-m_{1Li}$ and $m_{2Li}$. They can be given for the inductor $L_1$ by $m_{1L1}=DU_o/L_1$ and $m_{2L1}=D^2U_o/(D'L_1)$ as well as for the inductor $L_2$ by $m_{1L2}=U_o/L_2$ and $m_{2L2}=DU_o/(D'L_2)$ and for the inductor $L_3$ by $m_{1L3}=U_o/L_3$ and $m_{2L3}=DU_o/(D'L_3)$. The corresponding peak-to-peak ripple currents can be given by $\Delta i_{Li-pp}=m_{1Li}DT_s$ and the corresponding average currents are defined in (4). The selection of the inductors can be based on the defined peak-to-peak ripple and average currents.

In accordance with an exemplary embodiment, when the converter operated in the single PWM mode feeds a DC voltage bus, the control may be carried out in the following manner. Supposing that the power supply feeding the converter is a photovoltaic panel, a maximum power point tracker is used for extracting the maximum available power. The input current and voltage to the converter are measured. These measurements are fed to MPPT device which outputs a reference for the input voltage. The input voltage reference and the measured voltage are fed to a voltage controller which controls the voltage to the desired value by controlling the pulse ratio of the switches to a suitable value.

In accordance with an exemplary embodiment, the output voltage of the converter is limited to a maximum value. If the converter produces higher voltage than the limit, voltage is lowered by changing the operation point of the converter. This can be carried out by changing the input voltage reference so that the converter no longer operates at the maximum power point. To achieve this the measured output voltage and the value of the maximum output voltage are fed to a controller, and once the measured voltage exceeds the limit, the controller outputs a control term that is subtracted from the value produced by the MPPT. Of course, other measures can also be used for limiting the output voltage to a suitable level.

Dual PWM Mode

Figure 7:
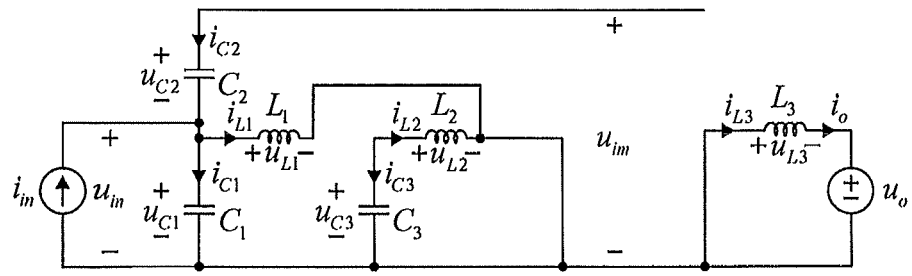
FIG. 7 shows the off-on-time circuit structure of the converter according to an exemplary embodiment of the present disclosure.

In the dual PWM mode, duty ratios of the buck and boost switch pairs ($S_1, S_3$ and $S_2, S_4$, respectively) are controlled separately, allowing e.g. dedicated control systems for the output current and input voltage as well as separate control of the intermediate voltage. Besides the on- and off-times of the single PWM converter, the circuit can exhibit two extra states denoted as on-off- and off-on-times. During the on-off-time, the switches $S_3$ and $S_4$ and the diode $D_2$ are off and the switches $S_1$ and $S_2$ and the diode $D_1$ are conducting, yielding the on-off-time circuit structure given in FIG. 5. During the off-on-time, the switches $S_3$ and $S_4$ and the diode $D_2$ are conducting and the switches $S_1$ and $S_2$ and the diode $D_1$ are off, yielding the off-on-time circuit structure given in FIG. 7.

During the on-off-time we can calculate applying Kirchhoff's laws that $$u_{L1} = u_{C1} - u_{C3}$$

$$u_{L2} = -u_{C1} - u_{C2} + u_{C3}$$

$$u_{L3} = u_{C1} + u_{C2} - u_o$$

$$i_{C1} = i_{in} - i_{L1} + i_{L2} - i_{L3}$$

$$i_{C2} = i_{L2} - i_{L3}$$

$$i_{C3} = i_{L1} - i_{L2}$$

$$u_{im} = u_{C1} + u_{C2}$$

$$u_{in} = u_{C1}$$

$$i_o = i_{L3} \qquad (5).$$

During the off-on-time we can calculate applying Kirchhoff's laws that $$u_{L1} = u_{C1}$$

$$u_{L2} = u_{C3}$$

$$u_{L3} = -u_o$$

$$i_{C1} = i_{in} - i_{L1}$$

$$i_{C2} = 0$$

$$i_{C3} = -i_{L2}$$

$$u_{im} = u_{C1} + u_{C2}$$

$$u_{in} = u_{C1}$$

$$i_o = i_{L3} \qquad (6).$$

In order to solve the average voltages across the inductors, average currents through the capacitors as well as average input voltage, intermediate voltage and output current, we assume synchronous PWM generation. The switching frequencies are assumed equal as well as the beginning of the on-times. The synchronous PWM generation is realized either by a digital control system or comparing the control signals to the same PWM-ramp in analog modulator as depicted in FIG. 8, where $G_a$ is the modulator related gain $1/V_m$ and $V_m$ is the peak-to-peak value of the PWM-ramp slope, scaling $d_1$ and $d_2$ between zero and one.

Figure 8:
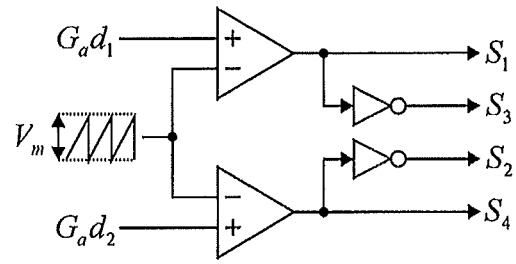
FIG. 8 shows an example of duty ratio and switch control signal generation according to an exemplary embodiment of the present disclosure.

According to FIG. 8 an extra state appears between on- and off-times when $d_1 \neq d_2$. If $d_1 > d_2$, the extra state is the on-off-time and if $d_1 < d_2$, the extra state is the off-on-time. Now the needed average values can be solved by common average integrals where $T_s$ is the cycle time. For $d_1 < d_2$ we get $$\langle u_{L1} \rangle = \frac{1}{T_s} \left( \int_0^{d_1 T_s} (u_{C1} - u_{C3}) dt + \int_{d_1 T_s}^{d_2 T_s} u_{C1} dt + \int_{d_2 T_s}^{T_s} u_{C1} dt \right) \qquad (7)$$

$$\langle u_{L2} \rangle = \frac{1}{T_s} \left( \int_0^{d_1 T_s} (-u_{C1} - u_{C2} + u_{C3}) dt + \int_{d_1 T_s}^{d_2 T_s} u_{C3} dt + \int_{d_2 T_s}^{T_s} u_{C3} dt \right)$$

$$\langle u_{L3} \rangle = \frac{1}{T_s} \left( \int_0^{d_1 T_s} -u_o dt + \int_{d_1 T_s}^{d_2 T_s} -u_o dt + \int_{d_2 T_s}^{T_s} (u_{C1} + u_{C2} - u_o) dt \right)$$

$$\langle i_{C1} \rangle = \frac{1}{T_s} \left( \begin{array}{l} \int_0^{d_1 T_s} (i_{in} - i_{L1} + i_{L2}) dt + \\ \int_{d_1 T_s}^{d_2 T_s} (i_{in} - i_{L1}) dt + \int_{d_2 T_s}^{T_s} (i_{in} - i_{L1} - i_{L3}) dt \end{array} \right)$$

$$\langle i_{C2} \rangle = \frac{1}{T_s} \left( \int_0^{d_1 T_s} i_{L2} dt + \int_{d_1 T_s}^{d_2 T_s} 0 dt + \int_{d_2 T_s}^{T_s} -i_{L3} dt \right)$$

$$\langle i_{C3} \rangle = \frac{1}{T_s} \left( \int_0^{d_1 T_s} (i_{L1} - i_{L2}) dt + \int_{d_1 T_s}^{d_2 T_s} -i_{L2} dt + \int_{d_2 T_s}^{T_s} -i_{L2} dt \right)$$

$$\langle u_{im} \rangle = \langle u_{C1} \rangle + \langle u_{C2} \rangle$$

$$\langle u_{in} \rangle = \langle u_{C1} \rangle$$

$$\langle i_o \rangle = \langle i_{L2} \rangle.$$

For $d_1 > d_2$ we get $$\langle u_{L1} \rangle = \qquad (8)$$

$$\frac{1}{T_s} \left( \int_0^{d_2 T_s} (u_{C1} - u_{C3}) dt + \int_{d_2 T_s}^{d_1 T_s} (u_{C1} - u_{C3}) dt + \int_{d_1 T_s}^{T_s} u_{C1} dt \right)$$

$$\langle u_{L2} \rangle = \frac{1}{T_s} \left( \begin{array}{l} \int_0^{d_2 T_s} (-u_{C1} - u_{C2} + u_{C3}) dt + \\ \int_{d_2 T_s}^{d_1 T_s} (-u_{C1} - u_{C2} + u_{C3}) dt + \int_{d_1 T_s}^{T_s} u_{C3} dt \end{array} \right)$$

$$\langle u_{L3} \rangle = \frac{1}{T_s} \left( \begin{array}{l} \int_0^{d_2 T_s} -u_o dt + \int_{d_2 T_s}^{d_1 T_s} (u_{C1} + u_{C2} - u_o) dt + \\ \int_{d_1 T_s}^{T_s} (u_{C1} + u_{C2} - u_o) dt \end{array} \right)$$

-continued $$\langle i_{C1} \rangle = \frac{1}{T_s} \begin{pmatrix} \int_0^{d_2 T_s} (i_{in} - i_{L1} + i_{L2}) dt + \\ \int_{d_2 T_s}^{d_1 T_s} (i_{in} - i_{L1} + i_{L2} - i_{L3}) dt + \\ \int_{d_1 T_s}^{T_s} (i_{in} - i_{L1} - i_{L3}) dt \end{pmatrix}$$

$$\langle i_{C2} \rangle = \frac{1}{T_s} \left( \int_0^{d_2 T_s} i_{L2} dt + \int_{d_2 T_s}^{d_1 T_s} (i_{L2} - i_{L3}) dt + \int_{d_1 T_s}^{T_s} -i_{L3} dt \right)$$

$$\langle i_{C3} \rangle = \frac{1}{T_s} \left( \int_0^{d_2 T_s} (i_{L1} - i_{L2}) dt + \int_{d_2 T_s}^{d_1 T_s} (i_{L1} - i_{L2}) dt + \int_{d_1 T_s}^{T_s} -i_{L2} dt \right)$$

$$\langle u_{im} \rangle = \langle u_{C1} \rangle + \langle u_{C2} \rangle$$

$$\langle u_{in} \rangle = \langle u_{C1} \rangle$$

$$\langle i_o \rangle = \langle i_{L2} \rangle.$$

Both (7) and (8) yield the same averages given by $$\langle u_{L1} \rangle = \langle u_{C1} \rangle - d_1 \langle u_{C3} \rangle$$

$$\langle u_{L2} \rangle = \langle u_{C3} \rangle - d_1 \langle u_{C1} \rangle - d_1 \langle u_{C2} \rangle$$

$$\langle u_{L3} \rangle = (1-d_2) \langle u_{C1} \rangle + (1-d_2) \langle u_{C2} \rangle - \langle u_o \rangle$$

$$\langle i_{C1} \rangle = \langle i_{in} \rangle - \langle i_{L1} \rangle + d_1 \langle i_{L2} \rangle + (d_2 - 1) \langle i_{L3} \rangle$$

$$\langle i_{C2} \rangle = d_1 \langle i_{L2} \rangle + (d_2 - 1) \langle i_{L3} \rangle$$

$$\langle i_{C3} \rangle = d_1 \langle i_{L1} \rangle - \langle i_{L2} \rangle$$

$$\langle u_{im} \rangle = \langle u_{C1} \rangle + \langle u_{C2} \rangle$$

$$\langle u_{in} \rangle = \langle u_{C1} \rangle$$

$$\langle i_o \rangle = \langle i_{L2} \rangle \quad (9)$$

In accordance with an exemplary embodiment, in order to maintain flux linkage and charge balances, the average voltages across the inductors and average currents through the capacitors have to be zero. According to these principles the operating-point-related steady-state variables become with denoting $D_2' = 1 - D_2$ and $D_1' = 1 - D_1$ $$I_{L1} = I_{in} \quad (10)$$

$$I_{L2} = D_1 I_{in}$$

$$I_{L3} = \frac{D_1^2}{D_2'} I_{in}$$

$$U_{C1} = \frac{D_1^2}{D_2'} U_o$$

$$U_{C2} = \frac{1 - D_1^2}{D_2'} U_o$$

$$U_{C3} = \frac{D_1}{D_2'} U_o$$

$$U_{im} = \frac{1}{D_2'} U_o$$

$$U_{in} = \frac{D_1^2}{D_2'} U_o$$

$$I_o = \frac{D_1^2}{D_2'} I_{in}.$$

The steady-state operating point solution is similar to the single PWM case, but the duty ratios of the buck- and boost- parts are separated. The switching frequency of the converter is again assumed to be $f_s$ and consequently, the cycle time $T_s = 1/f_s$. When $d_1 > d_2$ the duty cycle $D_2 = T_{on}/(T_{on\text{-}off} + T_{off})$ and therefore, the length of on-time $T_{on} = D_2 T_s$ and the length of off-time $T_{off} = D_1' T_s$ because $T_s = T_{on} + T_{on\text{-}off} + T_{off}$ and $T_{on\text{-}off} = D_1 T_s - D_2 T_s$. When $d_1 < d_2$ the duty cycle $D_1 = T_{on}/(T_{off\text{-}on} + T_{off})$ and therefore, the length of on-time $T_{on} = D_1 T_s$ and the length of off-time $T_{off} = D_2' T_s$ because $T_s = T_{on} + T_{off\text{-}on} + T_{off}$ and $T_{off\text{-}on} = D_2 T_s - D_1 T_s$.

Figure 9:
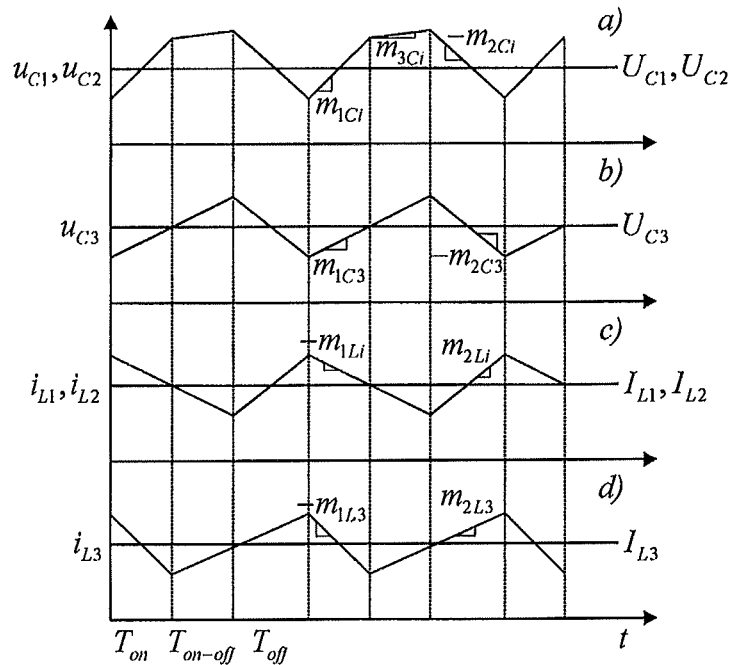
FIG. 9 shows approximate waveforms when d1>d2 according to an exemplary embodiment of the present disclosure.
Figure 10:
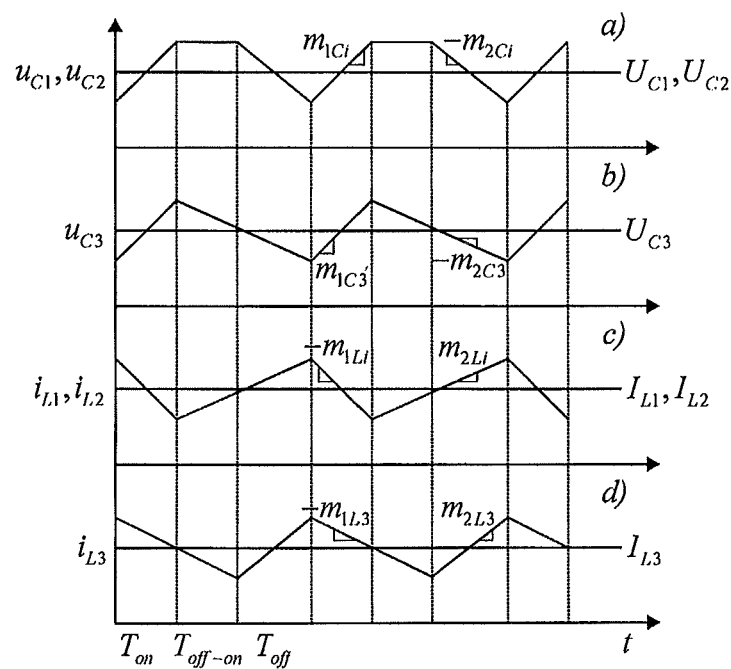
FIG. 10 shows approximate waveforms when d1<d2 according to an exemplary embodiment of the present disclosure.

The approximate waveforms of the capacitor voltages and inductor currents are shown in FIG. 9 and FIG. 10 for the corresponding duty ratio relations. The steady-state values are assumed to be large compared to the peak-to-peak ripple, e.g., only steady-state values affect the ripple slopes. The capacitor voltage slopes shown in FIG. 9 and FIG. 10 as the curves a) and b) can be given for the capacitor $C_1$ by $m_{1C1} = D_1 I_{in}/C_1$, $m_{2C1} = D_1^2 I_{in}/(D_2' C_1)$ and $m_{3C1} = (D_1 - D_1^2/D_2') I_{in}/C_1$ as well as for the capacitor $C_2$ by $m_{1C2} = D_1 I_{in}/C_2$, $m_{2C2} = D_1^2 I_{in}/(D_2' C_2)$ and $m_{3C2} = (D_1 - D_1^2/D_2') I_{in}/C_2$. The capacitor $C_3$ slopes can be given by $m_{1C3} = D_1' I_{in}$ and $m_{2C3} = D_1 I_{in}$.

Note that the slopes $m_{3Ci}$ are negative if $D_1 > D_2'$. When $D_1 = D_2'$, the slopes $m_{3Ci}$ are approximately zero. The capacitor $C_1$ and $C_2$ slopes are approximately zero also during the off-on-time. The peak-to-peak ripples associated to the capacitors can be determined according to the defined slopes. When $D_1 < D_2'$, $\Delta u_{Ci\text{-}pp} = m_{2Ci} T_{off}$, where $T_{off} = D_1' T_s$, when $d_1 > d_2$ and $T_{off} = D_2' T_s$ when $d_1 < d_2$. When $D_1 > D_2'$, $\Delta u_{Ci\text{-}pp} = m_{1Ci} T_{on}$, where $T_{on} = D_2 T_s$ when $d_1 > d_2$ and $T_{on} = D_1 T_s$ when $d_1 < d_2$. The average voltages are defined in (10). The selection of the capacitors can be based on the defined peak-to-peak ripple and average voltages.

The inductor current slopes shown in FIG. 9 and FIG. 10 as the curves c) and d) can be given for the inductor $L_1$ by $m_{1L1} = D_1 D_1' U_o/(D_2' L_1)$ and $m_{2L1} = D_1^2 U_o/(D_2' L_1)$ as well as for the inductor $L_2$ by $m_{1L2} = D_1' U_o/(D_2' L_2)$ and $m_{2L2} = D_1 U_o/(D_2' L_2)$. The inductor $L_3$ slopes can be given by $m_{1L3} = U_o/L_3$ and $m_{2L3} = D_2 U_o/(D_2' L_3)$. The corresponding peak-to-peak ripple currents can be given by $\Delta i_{Li} = m_{1Li} T_{on}$, where $T_{on} = D_2 T_s$ when $d_1 > d_2$ and $T_{on} = D_1 T_s$ when $d_1 < d_2$. The average currents are defined in (10). The selection of the inductors can be based on the defined peak-to-peak ripple and average currents.

When the converter operated in the dual PWM mode feeds a DC voltage bus, the control may be carried out in the following manner. Supposing that the power supply feeding the converter is a photovoltaic panel, a maximum power point tracker is used for extracting the maximum available power. The input current and voltage to the converter are measured. These measurements are fed to a MPPT device which outputs a reference for the input voltage. The input voltage reference and the measured voltage are fed to a voltage controller which controls the voltage to the desired value by controlling the pulse ratio of the switches $S_1$ and $S_3$ to a suitable value.

As the switches $S_1$, $S_3$ and switches $S_2$, $S_4$ are modulated separately, the output voltage can be kept at a desired level by modulating the switches $S_2$ and $S_4$.

The above calculations and the waveforms were obtained with synchronized switching periods. It is, however, clear, that the switches $S_1$, $S_3$ and $S_2$, $S_4$ can be modulated completely independent from each other, meaning that even the modulation frequency may not be the same for both switch pairs.

Grid Interfacing

In the above-described exemplary embodiments, the converter was described as providing voltage to a DC bus. In the following, the topology of the present disclosure is used for supplying power to alternating grid thereby forming effectively an inverter. The transformerless inverter technology is considered to be a low-cost and feasible solution for interfacing solar generator into the grid. The main problems of such solutions are considered to be the high common-mode currents and the fluctuation of the input power at twice the line frequency causing safety problems and reducing the energy harvesting efficiency.

Figure 11:
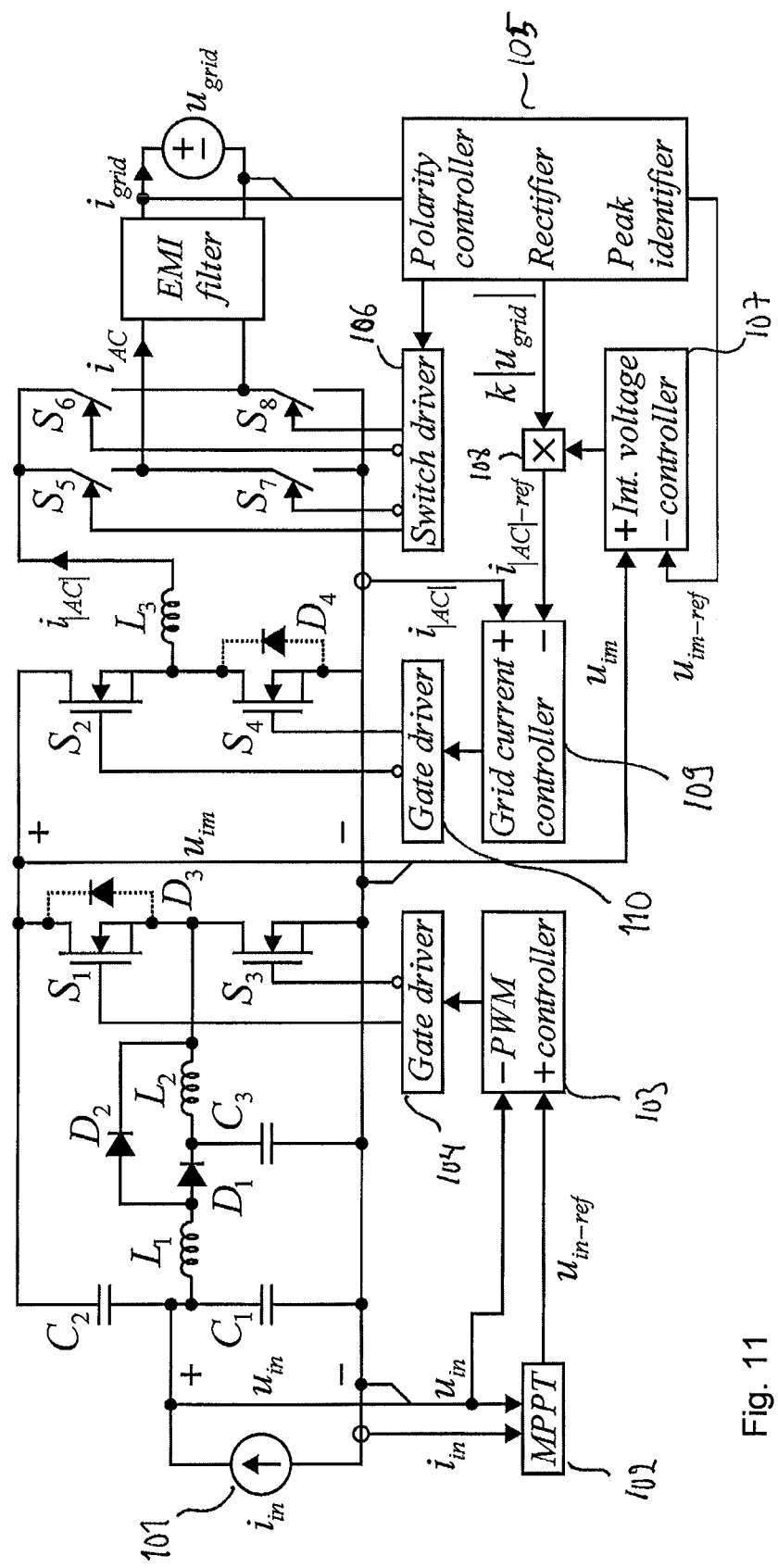
FIG. 11 shows the main circuit setup of the converter according to an exemplary embodiment of the present disclosure.

In accordance with an exemplary embodiment, the converter forms a single-phase current-fed solar inverter including a current-fed quadratic buck converter $S_1$, $S_3$ and boost converter $S_2$, $S_4$, a line-frequency inverter ($S_5$-$S_8$) and an EMI filter as shown in FIG. 11.

The buck converter keeps its input voltage constant at the voltage determined by the MPPT device by applying negative feedback control. The boost converter supplies full-wave rectified sinus shaped output current corresponding to the maximum power the input source (e.g., solar generator) can provide. The boost converter keeps its input voltage (e.g., the voltage of the sum of the input capacitors) constant at a level needed for supplying the grid current and determined by the input-voltage-monitoring device. The level can be chosen to minimize the losses in the buck and boost converters. The |AC|/AC inverter works in such a way that the switch pair ($S_5$,$S_7$) conducts during the line half cycle when the grid voltage is positive and the switch pair ($S_6$, $S_8$) during the line half cycle when the grid voltage is positive. The switches ($S_5$–$S_8$) can be implemented by several techniques including MOSFET, IGBT, silicon controlled rectifier, etc. The EMI filter, including, for example, a capacitor and inductor, connected at the output of the |AC|/AC converter removes the switching-frequency noise from the output current.

The current-fed semi-quadratic buck-boost converter integrated with a line-frequency inverter is a feasible solution for interfacing solar generator into the single-phase grid without an isolation transformer. The output current of the semi-quadratic buck-boost is shaped to resemble full-wave rectified grid voltage, which polarity is determined by the line-frequency inverter according to the grid voltage. The voltages imposed over parasitic capacitances from the input source to the neutral conductor are ideally free of high frequency noise, efficiently reducing ground leakage currents, which are considered main problems in transformerless grid connected photovoltaic applications. The main circuit setup of the inverter with the basic control functions is shown in FIG. 11.

The common-mode voltage created by the circuitry is free of high-frequency noise and half the grid voltage, which effectively reduces the common mode current. The input-voltage controlled of the buck converter effectively reduces the effect of the power fluctuation at the output of the input source down to zero. The intermediate voltage ($u_{im}$) has to be controlled to be slightly higher than the peak grid voltage but can be optimized in respect to the power losses in the buck and boost stages. The input voltage of the buck converter has to be less than the intermediate voltage and its minimum level is determined by the minimum usable duty ratio by $U_{in\text{-}min} = D^2_{min} U_{DC\text{-}max}$. The quadratic nature of the input converter enables the implementation of a module integrated solar inverter.

The dual PWM mode described above is used due to its advantages over the single PWM mode. The dedicated input voltage control efficiently reduces the effect of the output power fluctuation in the input with a modest increase in complexity. Smaller input capacitance is required while the energy harvesting efficiency is increased. The buck switch pair ($S_1$,$S_3$) is used to keep the input voltage constant at a level determined by the maximum power point tracking (MPPT) device by applying negative feedback control.

The boost switch pair ($S_2$,$S_4$) is used to deliver the full-wave rectified sinus shaped output current. It has been observed that high control bandwidths are hard to achieve under direct duty ratio control of the output current with current-fed converters. Dynamic analysis of the dual PWM semi-quadratic buck-boost converter reveals a right-half-plane (RHP) zero in the control-to-output related transfer functions of the boost-part limiting the control bandwidth. The RHP zero is a characteristic property of a boost converter, whether voltage fed or current fed. A positive feedback output current loop unstabilizes the converter but allows high bandwidth current reference tracking while the intermediate voltage $u_{im}$ keeps at adequate levels. Now it can be observed that the converter may be stabilized by another positive feedback loop from the intermediate voltage. After addition of the current loop, the dynamic analysis reveals a RHP pole in the output-current-reference-to-intermediate-voltage transfer function. According to system theory, the converter is stable when the intermediate voltage loop bandwidth exceeds the RHP pole frequency. Naturally, the input voltage controller affects also the dynamics of the boost-part.

In accordance with an exemplary embodiment, the intermediate voltage has to be kept at a level higher than the peak grid voltage. The grid voltage peak identifier determines the intermediate voltage reference to allow operation with various grid voltages. The level can be chosen to minimize the losses in the converter with a transient margin. The line-frequency inverter works in such a way that the switch pair $S_5$,$S_8$ conducts during the positive half of the grid voltage line cycle and the switch pair $S_6$,$S_7$ conducts during the line cycle half when the grid voltage is negative. Low conduction loss devices are recommended. The EMI filter connected at the output attenuates the switching frequency noise of the output current and ensures the EMC-compatibility of the inverter.

The control system of the inverter according to an exemplary embodiment of the present disclosure is described next with reference to FIG. 11. A current source 101, such as a photo voltaic panel, string or array, is connected to the input of the inverter. The current source produces input current $i_{in}$, which is measured together with the input voltage $u_{in}$. The measured values are fed to a maximum power point tracker 102, which calculates a reference value for the input voltage $u_{in\text{-}ref}$. When such a voltage is obtained to the input of the inverter, the PV panel is operated at is maximum power point and all available power is extracted from the panel.

The input voltage reference $U_{in\text{-}ref}$ is fed to a PWM controller 103 together with the measured input voltage $u_{in}$. The controller 103 produces a duty ratio for gate driver 104, which controls the switches $S_1$ and $S_3$ according to the obtained duty ratio for controlling the input voltage to correspond to the reference voltage. The switches $S_1$ and $S_3$ thus effectively control the input voltage to the reference voltage, which is obtained from the measured input current using an MPP algorithm.

In the inverter of the exemplary embodiment, the grid voltage $u_{grid}$ is also measured. The measured voltage value is fed to block 105. Block 105 serves as polarity controller for the inverter which is synchronized to the grid voltage. The polarity controller outputs the information of the polarity of the grid voltage to switch driver 106 which controls switches $S_5$ and $S_8$ conductive when the grid voltage is positive and switches $S_6$ and $S_7$ conductive when the grid voltage is negative.

Block 105 also includes a rectifier for obtaining the rectified sinusoidal shape of the grid voltage. The grid voltage is rectified and scaled by multiplying it with a constant k.

Further, block 105 includes a peak identifier, which identifies the amplitude of the grid voltage, for producing a reference value $U_{im\text{-}ref}$ for the intermediate voltage. The intermediate voltage $u_{im}$ is measured and fed to intermediate voltage controller 107 together with the reference value $u_{im\text{-}ref}$. The output of the voltage controller 107 is fed to a multiplier block 108 which multiplies the output and the scaled and rectified value of the grid voltage $k|u_{grid}|$ for producing a reference for the rectified value of grid current $i_{|AC|\text{-}ref}$. This reference value is fed to grid current controller which also receives measured grid current value $i_{|AC|}$. The measured value is also rectified value since it is measured before the inverting switches. Grid current controller 109 outputs a pulse ratio for gate driver 110, which controls switches $S_2$ and $S_4$ according to the pulse ratio for keeping the intermediate voltage at its reference value and for producing a current having a rectified sinusoidal shape in synchronism with the grid voltage.

To easily demonstrate the low frequency behavior of the inverter in FIG. 11, time domain simulations in steady-state have been carried out with a switching frequency averaged model (e.g., the switching frequency ripple is removed from the waveforms). The parameters used in the simulation are listed in Table 1.

TABLE 1

| Simulation parameters. | | | | | | | |
|---|---|---|---|---|---|---|---|
| $u_{in\text{-}ref}$ | $u_{in\text{-}ref}$ | $U_{grid}$ | $i_{in}$ | $C_1$ | $C_2$ | $C_3$ | $L_1$ | $L_2$ |
| 25 V | 360 V | 230 V | 7.5 A | 22 µF | 440 µF | 22 µF | 220 µH | 1 mH |

Figure 12:
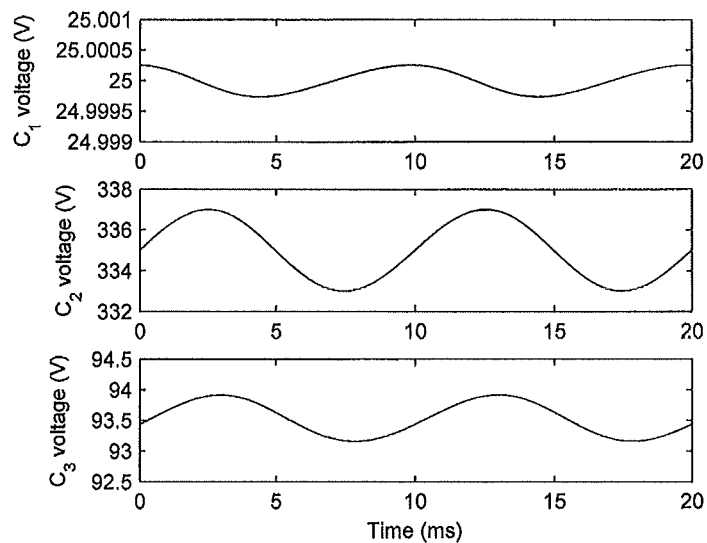
FIG. 12 shows switching frequency averaged capacitor voltages at the grid connected operation according to an exemplary embodiment of the present disclosure.
Figure 13:
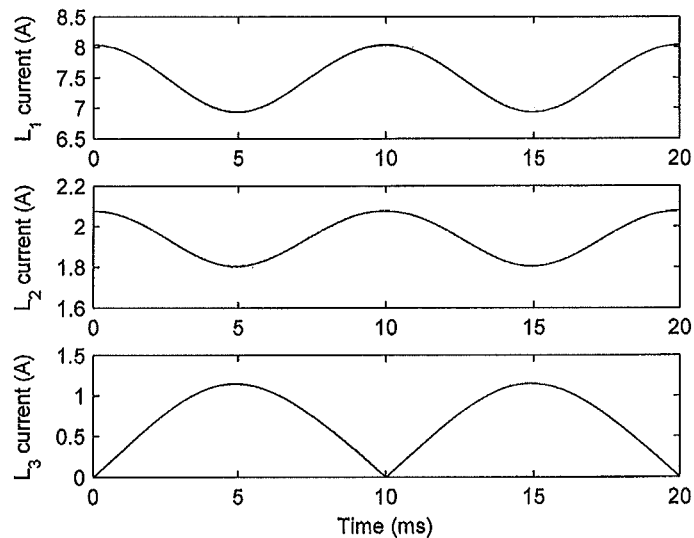
FIG. 13 shows switching frequency averaged inductor currents at the grid connected operation according to an exemplary embodiment of the present disclosure.
Figure 14:
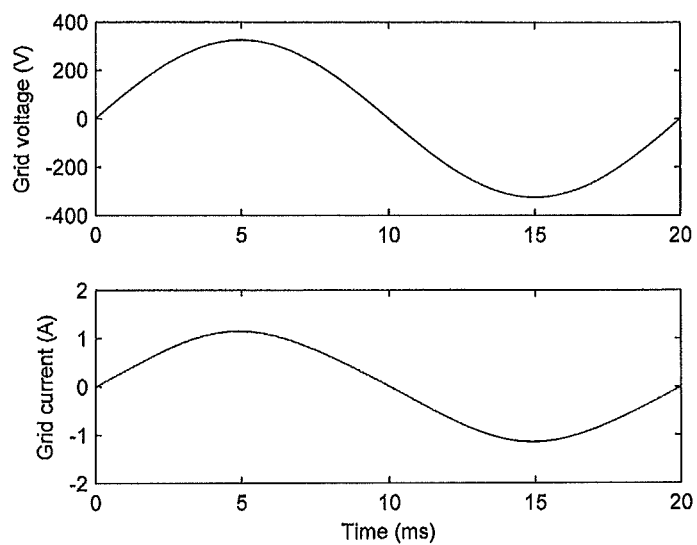
FIG. 14 shows waveforms of the grid variables according to an exemplary embodiment of the present disclosure.

FIG. 12 shows the capacitor voltages according to an exemplary embodiment. As can be seen, the input voltage (capacitor $C_1$ voltage, $u_{C1}$) ripple at twice the grid frequency can be controlled to negligibly small values. The voltage ripple at the intermediate voltage ($u_{C1}+u_{C2}$) is similar to the input voltage ripple in any common grid-connected single-phase photovoltaic inverter. The voltage $u_{C3}$ is scaled down from the intermediate voltage by the duty ratio $d_1$. The inductor currents according to an exemplary embodiment are shown in FIG. 13. The low-frequency ripple current of the capacitor $C_1$ is steered to the inductor $L_1$ in order to keep the input voltage constant. The ripple current of the inductor $L_2$ is scaled down from the inductor $L_1$ ripple current by the duty ratio $d_1$. The full-wave-rectified shaped current of the inductor $L_3$ forms the grid current after the line-frequency inverter. The resulting grid current with the grid voltage is shown in FIG. 14.

In order to design the inverter properly, the low frequency ripples needs to be solved. The switching frequency ripples were analyzed above in connection with the converter structure. The variables in angle brackets are the switching frequency averaged values. The low frequency ripples can be approximated by calculating the power fluctuation caused by the sinusoidal grid variables. The grid current controller injects sinusoidal current to the grid at unity power factor. The grid angular frequency is denoted by $\omega_0$. At steady-state $$\langle p_{grid} \rangle = \sqrt{2} U_{grid} \sin(\omega_0 t) \sqrt{2} I_{grid} \sin(\omega_0 t) = 2 P_{grid} \sin^2(\omega_0 t) \quad (11)$$

According to the trigonometric double-angle formulas $\sin^2(x) = (1-\cos(2x))/2$. Now it is clearly seen that the power fluctuates at twice the grid frequency. Given as a function of the input power and efficiency of the converter, denoted by η, steady-state grid power is $$\langle p_{grid} \rangle = \eta P_{in}(1-\cos(2\omega_0 t)) \quad (12).$$

Since the input voltage controller keeps the input voltage constant, the average current through the capacitor $C_1$ is zero. Accordingly, the power fluctuation imposed low frequency current appears through the capacitor $C_2$. At steady-state the dc-component must be zero in order to maintain the charge balance. If the ripple voltage over the capacitor $C_2$ is assumed small compared to the dc-component, we get (13) applying the current directions of FIG. 2.

$$\langle i_{C2} \rangle = \frac{\eta P_{in}}{(U_{im} - U_{in})} \cos(2\omega_0 t). \quad (13)$$

According to the basic circuit theory, the inductor voltages and capacitor currents can be presented as $$u_L = L \frac{di_L}{dt} \text{ and } i_C = C \frac{du_C}{dt},$$

respectively. The voltage ripple over the capacitor $C_2$ which is also the voltage ripple of the intermediate voltage, is $$\langle u_{C2\text{-}ripple} \rangle = \frac{\eta P_{in}}{2\omega_0 C_2 (U_{im} - U_{in})} \sin(2\omega_0 t). \quad (14)$$

Since the input current is constant, $\langle i_{C1} \rangle = 0$ and $\langle i_{L1} \rangle = \langle i_{in} \rangle + \rangle i_{C2} \rangle - \rangle i_{C1} \rangle$, the ripple current through the inductor $L_1$ is simply $$\langle i_{L1\text{-}ripple} \rangle = \langle i_{C2} \rangle = \frac{\eta P_{in}}{(U_{im} - U_{in})} \cos(2\omega_0 t). \quad (15)$$

In order to keep the input voltage constant and power flow towards the grid, the ripple current amplitude of the inductor $L_1$ must not exceed the input current. If the assumption for (13) is justified, we may also assume that the ripple component in the duty ratio $d_1$ is small compared to the dc-component. Now the ripple current of the inductor $L_2$ and the ripple voltage of the capacitor $C_3$ can be given as shown in (16) and (17), respectively.

$$\langle i_{L2\text{-}ripple} \rangle = D_1 \langle i_{L1\text{-}ripple} \rangle = \sqrt{\frac{U_{in}}{U_{im}}} \frac{\eta P_{in}}{(U_{im} - U_{in})} \cos(2\omega_0 t) \quad (16)$$

$$\langle u_{C3\text{-}ripple} \rangle = D_1 \langle u_{C2\text{-}ripple} \rangle = \sqrt{\frac{U_{in}}{U_{im}}} \frac{\eta P_{in}}{2\omega_0 C_2 (U_{im} - U_{in})} \sin(2\omega_0 t). \quad (17)$$

It is to be understood, that the converter also includes means for controlling the semiconductor components. These means comprise suitable drive circuitry able to control the components to a conductive and blocking state. Drive circuitry includes, for example, auxiliary power sources, modulators and other peripheral circuits. It is also clear that the above mentioned controller for current and voltage control are implemented in a manner known by the skilled person.

Further, the used maximum power point tracker may be of any available type as long as it produces a reference value for the input voltage. In the above description referring to drawings some of the features are incorporated in blocks. It is clear that the functionality required for the disclosure can be structured in functional blocks other than what is described above and in the drawings.

The converter of the present disclosure is described above mainly in connection with a photovoltaic panel. It is clear that the power source feeding current to the current-fed converter may be of any other type such as a superconducting magnetic energy storage (SMES).

It will be obvious to a person skilled in the art that the inventive concept can be implemented in various ways. The present disclosure and its embodiments are not limited to the examples described above but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A converter circuit comprising:
   first and second input terminals for receiving an input current from a current source;
   a first capacitor connected between the first and second input terminals;
   a second capacitor having a first terminal connected to the second input terminal, and a second terminal forming a positive voltage node;
   first and third semiconductor components connected in series between the first input terminal and the positive voltage node, a midpoint between the series connection forming a first node;
   a series connection of a first inductive component, a first diode and a second inductive component, the series connection being connected between the second input terminal and the first node, a polarity of the first diode being such that the first diode allows a current to pass from a direction of the second input terminal;
   a second node formed by a point between the first inductive component and the first diode;
   a third node formed by a point between the first diode and the second inductive component;
   a second diode connected between the second node and the first node to allow current to pass from a direction of the second node to the first node;
   a third capacitor connected between the first input terminal and the third node;
   second and fourth semiconductor components connected in series and in parallel with the series connection of the first and third semiconductor components;
   a third inductive component having a first end which is connected to a fourth node formed between the second and fourth semiconductor components, and a second end which produces first output terminal, the first input terminal forming a second output terminal,
   wherein the first and the third semiconductor components are configured to control a voltage between the first and second input terminals.

2. The converter according to claim 1, wherein the first and fourth semiconductor components are respectively one of diodes and switch components, and the second and third semiconductor components are switch components.

3. The converter according to claim 1, comprising:
   means for controlling at least one of (i) the first and third semiconductor components and (ii) the second and fourth semiconductor components.

4. The converter according to claim 3, wherein the means for controlling the first and third semiconductor components is configured to control the voltage between the first and second input terminals based on the input current.

5. The converter according to claim 4, comprising:
   a maximum power point tracking device configured to provide a voltage reference for an input voltage.

6. The converter according to claim 1, wherein the first and third semiconductor components comprise a first semiconductor pair, the second and fourth semiconductor components comprise a second semiconductor pair, and the first and second semiconductor pairs each receive the same control input.

7. The converter according to claim 1, wherein the first and third semiconductor components comprise a first semiconductor pair, the second and fourth semiconductor components comprise a second semiconductor pair, and the first semiconductor pair receives a different control input than the second semiconductor pair, and the second and fourth semiconductor components are configured to control a voltage of a series connection of first and second capacitors.

8. The converter according to claim 7, comprising:
   a controlled inverter connected to the output terminals of the converter for feeding power to a single phase alternating grid;
   means for determining a polarity of a voltage of the grid;
   means for producing a signal representing a pulse shape of a rectified grid voltage;
   means for determining a peak voltage of the grid voltage;
   means for controlling a voltage of a sum of the first and second capacitors such that current is feedable to the grid; and
   means for controlling the second and fourth semiconductor components such that an output current from the controlled inverter is in phase with the grid voltage.

9. A method for controlling a converter, wherein the converter includes:
   first and second input terminals for receiving an input current from a current source;
   a first capacitor connected between the first and second input terminals;
   a second capacitor having a first terminal connected to the second input terminal, and a second terminal forming a positive voltage node;
   first and third semiconductor components connected in series between the first input terminal and the positive voltage node, a midpoint between the series connection forming a first node;
   a series connection of a first inductive component, a first diode and a second inductive component, the series connection being connected between the second input terminal and the first node, a polarity of the first diode being such that the first diode allows a current to pass from a direction of the second input terminal;
   a second node formed by a point between the first inductive component and the first diode;
   a third node formed by a point between the first diode and the second inductive component;
   a second diode connected between the second node and the first node to allow current to pass from a direction of the second node to the first node;

a third capacitor connected between the first input terminal and the third node;

second and fourth semiconductor components connected in series and in parallel with the series connection of the first and third semiconductor components; and a third inductive component having a first end which is connected to a fourth node formed between the second and fourth semiconductor components, and a second end which produces first output terminal, the first input terminal forming a second output terminal, wherein the method comprises:

measuring the input current and input voltage;

generating a voltage reference for the input voltage; and controlling the first and third semiconductor components in response to the measured input voltage and the voltage reference.

10. The method for controlling the converter according to claim 9, wherein the first and third semiconductor components comprise a first semiconductor pair, the second and fourth semiconductor components comprise a second semiconductor pair, the first and second semiconductor component pairs receive a different input than each other, and the second and fourth semiconductor components are configured to control a voltage of a series connection of the first and second capacitors, wherein the converter includes a controlled inverter connected to the first and second output terminals of the converter for feeding power to a single phase alternating grid, and wherein the method comprises:

measuring voltage of the grid;

rectifying and scaling the grid voltage;

measuring voltage of the series connection of the first and second capacitors;

producing a reference value for the voltage of the series connection of the first and second capacitors;

measuring current of an output of the converter; and controlling the second and fourth semiconductor components based on the measured voltage of the series connection of the first and second capacitors, the reference value for the voltage of the series connection of first and second capacitors, the rectified and scaled grid voltage and the measured output current of the converter for producing output current from the controlled inverter that has the same phase and shape as the grid voltage.

11. The converter according to claim 3, wherein the first and third semiconductor components comprise a first semiconductor pair, the second and fourth semiconductor components comprise a second semiconductor pair, and the first and second semiconductor pairs receive the same control.

12. The converter according to claim 5, wherein the first and third semiconductor components comprise a first semiconductor pair, the second and fourth semiconductor components comprise a second semiconductor pair, and the first and second semiconductor pairs receive the same control.

13. The converter according to claim 3, wherein the first and third semiconductor components comprise a first semiconductor pair, the second and fourth semiconductor components comprise a second semiconductor pair, and the first semiconductor pair receives different control, and the second and fourth semiconductor components are configured to control a voltage of the series connection of first and second capacitors.

14. The converter according to claim 13, comprising:

a controlled inverter connected to the output terminals of the converter for feeding power to a single phase alternating grid;

means for determining a polarity of a voltage of the grid;

means for producing a signal representing a pulse shape of a rectified grid voltage;

means for determining a peak voltage of the grid voltage;

means for controlling a voltage of a sum of the first and second capacitors such that current is able to be fed to the grid; and means for controlling the second and fourth semiconductor components such that an output current from the controlled inverter is in phase with the grid voltage.

15. The converter according to claim 5, wherein the first and third semiconductor components comprise a first semiconductor pair, the second and fourth semiconductor components comprise a second semiconductor pair, and the first semiconductor pair receives a different input than the second semiconductor pair, and the second and fourth semiconductor components are configured to control a voltage of a series connection of first and second capacitors.

16. The converter according to claim 15, comprising:

a controlled inverter connected to the output terminals of the converter for feeding power to a single phase alternating grid;

means for determining a polarity of a voltage of the grid;

means for producing a signal representing a pulse shape of a rectified grid voltage;

means for determining a peak voltage of the grid voltage;

means for controlling a voltage of a sum of the first and second capacitors such that current is able to be fed to the grid; and means for controlling the second and fourth semiconductor components such that an output current from the controlled inverter is in phase with the grid voltage.

* * * * *